United States Patent [19]

Song

[11] 4,278,577

[45] Jul. 14, 1981

[54] BIS(SULFONAMIDE) STABILIZERS FOR SYNTHETIC POLYMERS

[75] Inventor: John Song, Carlsbad, Calif.

[73] Assignee: American Cyanamid Company, Stamford, Conn.

[21] Appl. No.: 171,620

[22] Filed: Jul. 23, 1980

Related U.S. Application Data

[63] Continuation-in-part of Ser. No. 79,690, Sep. 28, 1979, abandoned.

[51] Int. Cl.$^3$ .................... C08L 91/00; C07C 143/79
[52] U.S. Cl. ........................... 260/23 H; 260/23 XA; 260/45.9 R; 260/23 S; 564/83
[58] Field of Search .................... 564/83; 260/45.9 R, 260/45.9 NC, 23 H, 23 XA, 23 S

[56] References Cited

U.S. PATENT DOCUMENTS

| 4,013,621 | 3/1977 | Knell .................... 260/556 AR X |
| 4,098,764 | 7/1978 | Gencarelli et al. ......... 260/45.9 R X |
| 4,100,191 | 7/1978 | Fischer et al. ........... 260/45.9 NC X |
| 4,120,896 | 10/1978 | Conrow et al. .................. 424/321 X |
| 4,157,257 | 6/1979 | Takematsu et al. ...... 260/556 AR X |
| 4,187,246 | 2/1980 | Spivack et al. .......... 260/45.9 NC X |

FOREIGN PATENT DOCUMENTS 42-1021567  6/1967  Japan ................................ 260/556 AR

*Primary Examiner*—Thomas A. Waltz
*Attorney, Agent, or Firm*—Bruce F. Jacobs

[57] ABSTRACT

Bis(sulfonamides) containing one or more hindered phenol groups are disclosed, as is their use as thermal stabilizers for polymers. Further stabilization results from combinations thereof with a thiodipropionate ester and a divalent metal salt of a carboxylic acid.

20 Claims, No Drawings

BIS(SULFONAMIDE) STABILIZERS FOR SYNTHETIC POLYMERS

CROSS REFERENCE TO RELATED APPLICATIONS

This application is a continuation-in-part of U.S. Ser. No. 79,690 filed Sept. 28, 1979, now abandoned.

This invention relates to novel sulfonamides containing a hindered phenol which are useful for the stabilization of synthetic polymers, especially polyolefins, against thermal degradation. It also relates to certain novel combinations of such compounds with a thiodipropionate ester and a divalent metal salt of a carboxylic acid for such stabilization.

It is well-known that heat causes oxidative degradation of certain synthetic polymers, particularly polyolefins, as evidenced by embrittlement or yellowing of plastic articles made therefrom. It is also well-known that this degradation can be inhibited by use of antioxidant heat stabilizers incorporated in polymers. Many hindered-phenol antioxidants are well-known and conventionally used in polymers. Illustrative of these hindered-phenol antioxidants are those disclosed in U.S. Pat. Nos. 3,285,855, 3,531,483, 3,637,582, 3,649,667, 3,660,352, 3,676,449, and 3,810,929. Since none of these antioxidants has been found to be completely satisfactory, research continues in order to find compounds or combinations of compounds which will be more satisfactory. The present invention arose out of such research and resulted in the discovery of novel compounds which stabilize synthetic polymers, particularly polyolefins, against thermal degradation while considerably reducing the yellowing caused by said degradation.

This invention relates to bis(sulfonamides) represented by the formula (I)

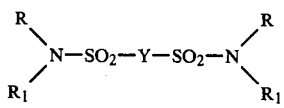  (I)

wherein Y is phenylene, biphenylene, and phenylene or biphenylene substituted with from one to four alkyl ($C_1$-$C_{18}$) groups; R is alkyl ($C_1$-$C_{18}$); $R_1$ is

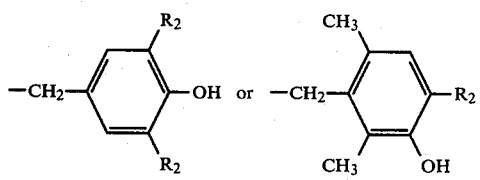

and $R_2$ is branched alkyl ($C_3$-$C_{12}$).

Preferably, the compounds are of the structure:

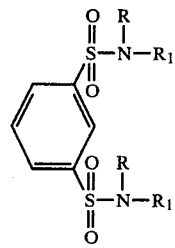

wherein R is as defined above, though most preferably in this case R is n-butyl, 2-ethylhexyl, or n-octadecyl.

Also preferably the compounds are of the structure:

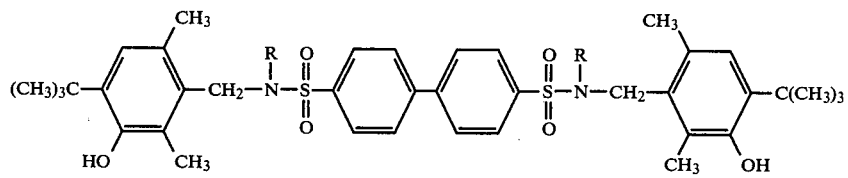

wherein R is as defined above, though most preferably in this case R is n-butyl or n-octadecyl.

The invention also relates to the use of these sulfonamides either alone or in combination with a thiodipropionate ester and a divalent metal salt of a fatty acid of 12 to 20 carbon atoms, to stabilize synthetic polymers, especially polyolefins, against thermal degradation.

The invention also relates to polymer compositions stabilized by the incorporation of said sulfonamides, alone or in combination with a thiodipropionate ester and a divalent metal salt of a fatty acid of 12 to 20 carbon atoms.

The advantages of the compounds of the present invention are that they provide thermal stability to synthetic polymers equivalent to that provided by the hindered phenol compounds of the prior art with considerably less yellowing.

The compounds of the present invention may be prepared by reacting a compound of formula (II)

  (II)

wherein R and $R_1$ are as previously defined, with the equivalent amount of a sulfonyl chloride, represented by formula (III)

  (III)

in acetone, or a mixture of acetone and water, in the presence of sufficient alkalizing agent, such as 50% caustic soda, to neutralize the hydrogen chloride generated in the reaction, while maintaining the reaction mixture at about 25°-35° C. The mixture is then stirred at ambient temperature until the reaction is completed. The product which separates from the reaction mixture may be recovered directly or after drowning the reaction mixture in ice water. The crude product is usually recovered as an oil which crystallizes upon standing. Purification of the crude product is effected by recrystallization from a suitable solvent, such as glacial acetic acid, methyl isobutyl ketone, n-propanol, and the like.

Suitable compounds of formula (II) which can be used in this reaction include the following:
6-t-butyl-3-(butylaminomethyl)-2,4-dimethylphenol,
6-t-butyl-3-(2-ethylhexylaminomethyl)-2,4-dimethylphenol,
6-t-butyl-3-(octadecylaminomethyl)-2,4-dimethylphenol,
6-isopropyl-3-(octadecylaminomethyl)-2,4-dimethylphenol,
6-(2-ethylhexyl)-3-(butylaminomethyl)-2,4-dimethylphenol,
6-t-butyl-3-(methylaminomethyl)-2,4-dimethylphenol,
6-isododecyl-3-(butylaminomethyl)-2,4-dimethylphenol,
2,6-diisopropyl-4-(butylaminomethyl)phenol,
2,6-di-t-butyl-4-(2-ethylhexylaminomethyl)-phenol,
2,6-diisododecyl-4-(octadecylaminomethyl)-phenol.

Suitable compounds of formula III include the following:
1,3-benzenedisulfonyl chloride,
1,4-benzenedisulfonyl chloride,
4,4'-biphenyldisulfonyl chloride,
2-methyl-1,3-benzenedisulfonyl chloride,
5-t-butyl-1,3-benzenedisulfonyl chloride,
5-n-octadecyl-1,3-benzenedisulfonyl chloride,
3,3'-dimethyl-4,4'-biphenyldisulfonyl chloride, and the like.

The following compounds are exemplary of the compounds of this invention:
N,N'-dibutyl-N,N'-bis(4-t-butyl-3-hydroxy-2,6-dimethylbenzyl)-m-benzenedisulfonamide,
N,N'-dimethyl-N,N'-bis(4-t-butyl-3-hydroxy-2,6-dimethylbenzyl)-m-benzenedisulfonamide,
N,N'-dioctadecyl-N,N'-bis(4-t-butyl-3-hydroxy-2,6-dimethylbenzyl)-m-benzenedisulfonamide,
N,N'-didodecyl-N,N'-bis(4-t-butyl-3-hydroxy-2,6-dimethylbenzyl)-m-benzenedisulfonamide,
N,N'-bis(2-ethylhexyl)-N,N'-bis(4-t-butyl-3-hydroxy-2,6-dimethylbenzyl)-m-benzenedisulfonamide,
N,N'-dibutyl-N,N'-bis(3,5-di-t-butyl-4-hydroxybenzyl)-m-benzenedisulfonamide,
N,N'-dibutyl-N,N'-bis(3,5-diisopropyl-4-hydroxybenzyl)-m-benzenedisulfonamide,
N,N'-dibutyl-N,N'-bis(4-t-butyl-3-hydroxy-2,6-dimethylbenzyl)-4,4'-biphenyldisulfonamide,
N,N'-dibutyl-N,N'-bis(4-t-butyl-3-hydroxy-2,6-dimethylbenzyl)-3,3'-biphenyldisulfonamide,
N,N'-didodecyl-N,N'-bis(4-t-butyl-3-hydroxy-2,6-dimethylbenzyl)-3,4'-biphenyldisulfonamide.

The compounds of formula (I) may be incorporated in the polymeric material by any of the various procedures known in the art for such purpose, such as by dry blending the stabilizer with the polymer in powder or granular form followed by milling, Banbury mixing, molding, casting, extruding, swelling, and the like; by immersing the polymer as film, sheet, fibers, or the like in a solution of the stabilizer in an appropriate solvent (as in a dyeing process), or any other well-known manner.

The amount of the compound of formula (I), needed to be an effective amount for stabilizing a polymer against degradation, will depend on the nature of the polymer and the amount of exposure to heat and air to which the article will be subjected. For most purposes it is sufficient to use an amount of the compound of formula (I) within the range of about 0.01 to about 5.0 percent by weight, preferably 0.05 to 1.0 percent by weight, based on the weight of untreated polymer.

Examples of suitable synthetic polymers include the following:
polyethylene,
polypropylene,
poly(vinyl chloride),
poly(methyl methacrylate),
poly(styrene),
high-impact poly(styrene),
polycarbonate,
poly(caprolactam),
poly(hexamethylene adipamide),
poly(hexamethylene terephthalamide),
poly(methyl acrylate),
poly(ethylene terephthalate),
cellulose acetate,
acrylonitrile-butadiene-styrene copolymers,
butadiene-styrene copolymers,
acrylonitrile-styrene copolymers,
butadiene-acrylonitrile copolymers, and the like, and blends thereof.

The preferred polymer is polypropylene.

Further in accordance with the present invention, synthetic polymers can be stabilized against thermal degradadation by the use of a a combination of a thiodipropionate ester and a divalent salt of a fatty acid, or mixture of fatty acids, of about 12 to 20 carbon atoms, in an amount of 0.1 to 2 percent by weight of the thiodipropionate ester, and 0.05 to 0.5 percent by weight of the divalent metal salt based on the weight of the polymer.

Illustrative of the thiodipropionate esters are the following:
distearyl thiodipropionate,
dilauryl thiodipropionate,
ditridecyl thiodipropionate,
lauryl stearyl thiodipropionate,
dimyristyl thiodipropionate.

Illustrative of the divalent metals are calcium, barium, zinc, lead, and cadmium. Illustrative of the fatty acids are lauric, oleic, and stearic acids. Representative salts include calcium stearate, calcium laurate, calcium oleate, barium stearate, barium laurate, zinc oleate, zinc stearate, lead stearate, cadmium stearate, and the like. Preferably calcium stearate is used.

The following examples are given to illustrate the present invention. All parts are by weight unless otherwise specified.

EXAMPLE 1

Preparation of
N,N'-Dibutyl-N,N'-Bis(4-t-butyl-3-hydroxy-2,6-dimethylbenzyl)-m-Benzenedisulfonamide To a stirred solution of 6-t-butyl-3-(butylaminomethyl)-2,4-dimethylphenol (5.26 grams; 0.02 mole) in acetone (40 mls) is slowly added 1,3-benzenedisulfonyl chloride (2.75 grams; 0.01 mole) while maintaining the temperature at 25°–30° C. by cooling. To this mixture is slowly added a solution of 50% caustic soda (1.6 grams; 0.02 mole) in water (22 mls) while maintaining the temperature at 25°–30° C. by cooling. The mixture is allowed to come to room temperature and stirred for 15 hours. The mixture is then allowed to settle, and the upper layer is separated and slowly treated with ice water (100 mls). The resulting oil which separates solidifies upon standing for 2.5 hours. The solid is then recovered by filtration to obtain the crude product (7.3 grams; 100% of theoretical). Recrystallization of the crude product from glacial acetic acid affords the pure product (2.5 grams; m.p. 143°–144.5° C.).

Calculated for $C_{40}H_{60}N_2O_6S_2$: C,65.90; H,8.29; N,3.84; S,8.80; Found: C,65.30; H,8.24; N,3.85; S,8.53.

EXAMPLE 2

Preparation of N,N'-Dibutyl-N,N'-Bis-(4-t-butyl-3-hydroxy-2,6-dimethylbenzyl)-4,4'-Biphenyldisulfonamide The procedure of Example 1 is followed using 4,4'-biphenyldisulfonyl chloride (3.51 grams; 0.01 mole) instead of m-benzenedisulfonyl chloride, in 58 mls of acetone. The product slowly precipitates from the reaction mixture during the reaction period. After stirring for 15 hours, the reaction mixture is drowned with water to completely precipitate the product. The precipitate is then recovered by filtration to obtain the crude product (6.82 grams; 82% of theoretical). Recrystallization of the crude product from methyl isobutyl ketone affords the pure product (3.5 grams; m.p. 225°–227° C.).

Calculated for $C_{46}H_{64}N_2O_6S_2$: C,68.62; H,8.01; N,3.48; S,7.97; Found: C,67.88; H,7.93; N,3.29; S,8.47.

EXAMPLE 3

Preparation of N,N'-Bis(4-t-butyl-3-hydroxy-2,6-dimethylbenzyl)-N,N'-Bis(2-ethylhexyl)-m-Benzenedisulfonamide The procedure of Example 1 is followed using 6-t-butyl-3-(2-ethylhexylaminomethyl)-2,4-dimethylphenol (13.40 grams; 0.042 mole) and 1,3-benzenedisulfonyl chloride (5.5 grams; 0.02 mole) in a mixture of acetone (100 mls) and water (35 mls) while adding a solution of sodium hydroxide (1.76 grams; 0.044 mole) in water (15 mls) and maintaining the temperature at 30°–35° C. The mixture is allowed to stand at ambient temperature for 15 hours. After separating the oily layer, treating the same with ice water to effect crystallization, the solid is filtered to obtain the crude product (15.5 grams; 92% of theoretical). Recrystallization of the crude product from a mixture of benzene and cyclohexane (1 volume: 2 volumes, respectively) affords the desired product (5.5 grams; m.p. 135°–136° C.).

Calculated for $C_{48}H_{70}N_2O_6S_2$: C,68.57; H,9.05; N,3.33; S,7.62; Found: C,68.59; H,9.33; N,4.08; S,7.52.

EXAMPLE 4

Preparation of N,N'-Bis(4-t-butyl-3-hydroxy-2,6-dimethylbenzyl)-N,N'-Dioctadecyl-4,4'-Biphenyldisulfonamide To a stirred solution of 6-t-butyl-3-(octadecylaminomethyl)-2,4-dimethylphenol (9.18 grams; 0.02 mole) in acetone (80 mls) at 35° C. there is added 4,4'-biphenyldisulfonyl chloride (3.5 grams; 0.01 mole) over a period of 20 minutes while maintaining the temperature at 35° C. The mixture is stirred for an additional hour at 35° C. and a solution of 50% caustic soda (1.6 grams; 0.02 mole) in water (8 mls) is added to the reaction mixture which is then allowed to stir at room temperature for 20 hours. The reaction mixture is then treated with water (50 mls) and the resulting precipitate is recovered by filtration, washed with methanol, and dried to obtain the crude product (9.2 grams; 77% of theoretical). Recrystallization of the crude product from n-propanol affords the pure product (4.2 grams; m.p. 208°–210° C.).

Calculated for $C_{74}H_{120}N_2O_6S_2$: C,74.20; H,10.10; N,2.34; S,5.35; Found: C,73.79; H,9.85; N,2.29; S,5.67.

EXAMPLE 5

Preparation of N,N'-Bis(4-t-butyl-3-hydroxy-2,6-dimethylbenzyl)-N,N'-Dioctadecyl-m-Benzenedisulfonamide A stirred solution of 6-t-butyl-3-(octadecylaminomethyl)-2,4-dimethylphenol (9.18 grams; 0.02 mole) in tetrahydrofuran (50 mls) is treated with a solution of 1,3-benzene-disulfonyl chloride (2.7 grams; 0.01 mole) in acetone (10 mls) over a period of 10 minutes while maintaining the temperature at 35°–40° C. The reaction mixture is then slowly treated with a solution of 50% caustic soda (1.6 grams; 0.02 mole) in water (5 mls) over a period of 15 minutes while the temperature is maintained at 30°–35° C. The mixture is then stirred at room temperature for 20 hours and treated with water (30 mls). The reaction mixture is allowed to settle, and the organic layer is split off and concentrated to obtain a viscous oil which solidifies upon mixing with methanol (25 mls). After allowing the reaction mixture to stand at room temperature for 18 hours, the methanol is removed by evaporation and replaced with absolute ethanol (20 mls). The solid is recovered by filtration to obtain the crude product (4.0 grams; 35.8% of theoretical). Recrystallization from absolute ethanol containing 20% methanol affords the pure product (3.1 grams; m.p. 81°–82° C.).

Calculated for $C_{68}H_{116}N_2O_6S_2$: C,72.80; H,10.42; N,2.50; S,5.72; Found: C,73.11; H,10.33; N,2.71; S,6.07.

EXAMPLES 6–10

Test films are prepared by dry blending 100 grams of unstabilized polypropylene with 0.1 gram each of the stabilizer and calcium stearate, and a small amount of isopropanol, milling the blend at 165°–170° C. on a standard two-roll laboratory mill, and then compression molding the milled material into films, about 20 mls thick, at 200° C. The films are then aged in a forced-draft oven at 150° C., and the effectiveness in inhibiting thermal degradation is determined by noting the time in hours to embrittlement. The results obtained are shown in Table I, along with controls having (a) no added stabilizer and (b) no calcium stearate.

TABLE I

| Example | Stabilizer | Hours to Embrittlement[1] |
|---|---|---|
| 6 | Product of Example 1 | 658 |
| 7 | Product of Example 2 | 64 |
| 8 | Product of Example 3 | 802 |
| 9 | Product of Example 4 | 160 |
| 10 | Product of Example 5 | 403 |
| | Control[a] | 5.5 |
| | Control[b] | 5.5 |

[1]Average of duplicate determinations
[a]Unstabilized polypropylene film plus calcium stearate
[b]Unstabilized polypropylene film without calcium stearate The results in Table I show that the stabilizer compounds of this invention are effective in inhibiting thermal degradation of polypropylene, and that calcium stearate is not a stabilizer for polypropylene.

EXAMPLES 11–15

Test films are prepared and heat-aged, as described in Examples 6–10, except that the compositions contain 0.1% of the indicated stabilizer, 0.25% distearyl thiodipropionate, and 0.1% calcium stearate. The results obtained are shown in Table IV.

TABLE IV

| Example | Stabilizer | Yellowing Index | | | | Hours to Embrittlement |
|---|---|---|---|---|---|---|
| | | Initially | After 8 Hrs | After 12 Hrs | After 16 Hrs | |
| 21 | Product of Example 3 | 17.2 | 27.7 | 32.8 | 36.5 | 12–16 |
| 22 | Comparison Compound A[1] | 17.4 | 44.0 | 52.5 | 64.0 | 12–16 |
| 23 | Comparison Compound B[2] | 14.2 | 24.5 | 54.9 | 62.8 | 8–12 |
| 24 | Comparison Compound C[3] | 17.4 | 34.1 | 44.9 | 56.1 | 12 |

[1] 2,2'-methylenebis(4-ethyl-6-t-butylphenol)
[2] pentaerythrityl tetrakis-3-(3,5-di-t-butyl-4-hydroxyphenyl)propionate
[3] octadecyl 3,5-di-t-butyl-4-hydroxyphenyl)ptopionate tained are shown in Table II, along with suitable controls.

TABLE II

| Example | Stabilizer | Hours to Embrittlement[1] |
|---|---|---|
| 11 | Product of Example 1 | 2498 |
| 12 | Product of Example 2 | 1298 |
| 13 | Product of Example 3 | 3647 |
| 14 | Product of Example 4 | 3551 |
| 15 | Product of Example 5 | 3862 |
| | Control[a] | 5.5 |
| | Control[b] | 116 |
| | Control[c] | 284 |

Note:
[1] Average of duplicates determinations
[a] Unstabilized polypropylene film plus 0.1% calcium stearate
[b] Unstabilized polypropylene film plus 0.25% distearyl thiodipropionate
[c] Unstabilized polypropylene film plus 0.1% calcium stearate plus 0.25% distearyl thiodipropionate

EXAMPLE 16–20

Test plaques are prepared and heat-aged, as described in Examples 6–10, except that the compositions contain 0.10% of the indicated stabilizer, 0.25% distearyl thiodipropionate, and 0.1% calcium stearate, and the milled mixture is compression molded at 205° C. to obtain plaques, about 40 mils thick. The plaques are aged in a forced-draft oven at 150° C. and the hours to embrittlement noted. The results obtained are shown in Table III, along with a control with none of the three additives, and a comparison example with the stabilizer being pentaerythrityl tetrakis 3-(3,5-di-tert-butyl-4-hydroxyphenyl) propionate.

TABLE III

| Example | Stabilizer | Hours to Embrittlement[1] |
|---|---|---|
| 16 | Product of Example 1 | 3924 |
| 17 | Product of Example 2 | 1163 |
| 18 | Product of Example 3 | 4179 |
| 19 | Product of Example 4 | 4403 |
| 20 | Product of Example 5 | 4355 |
| | Control | 5.5 |
| | Comparison Example | 2851 |

[1] Average of duplicate determinations

EXAMPLES 21–24

The compound of Example 3 and comparison hindered phenol antioxidants were evaluated in an unstabilized acrylonitrile-butadiene-styrene copolymer (Marbon Chemical Co.) at 0.5% in a formulation containing 0.5% zinc stearate as a lubricant, and 5% titanium dioxide pigment. The additive was incorporated into the formulation by dry blending, milling the blend on a two-roll laboratory mill under full steam pressure for 5 minutes and compression molding at 175° C. into 50-mil plaques. The plaques were oven-aged in a forced-draft oven at 150° C. and the efficiency of the material as a stabilizer was measured in terms of discoloration (yellowing) and hours to embrittlement. The results obtained are shown in Table IV.

The results in Table IV show that the compound of Example 3 affords protection against thermal degradation (embrittlement) equal to the best comparison compound, while showing a yellowing index which is considerably less than the indices of the comparison compounds.

What is claimed is:

1. A compound of the formula:

$$\begin{array}{c} R \\ \diagdown \\ R_1 \end{array} N-SO_2-Y-SO_2-N \begin{array}{c} R \\ \diagup \\ R_1 \end{array}$$

wherein Y is selected from phenylene, biphenylene and phenylene or biphenylene substituted with one to four alkyl ($C_1$-$C_{18}$) groups, R is alkyl ($C_1$-$C_{18}$); $R_1$ is $$-CH_2-\underset{R_2}{\overset{R_2}{\underset{\bigcirc}{\phantom{X}}}}-OH \quad \text{or} \quad -CH_2-\underset{CH_3}{\overset{CH_3}{\underset{\bigcirc}{\phantom{X}}}}-R_2$$
$$\phantom{-CH_2-}\qquad\qquad\qquad\qquad\qquad OH$$

and $R_2$ is branched alkyl ($C_3$-$C_{12}$).

2. The compounds of claim 1 wherein Y is phenylene.

3. The compounds of claim 2 represented by the formula:

$$\begin{array}{c} O \quad R \\ \| \quad | \\ S-N-R_1 \\ | \\ O \\ \bigcirc \\ O \\ \| \quad | \\ S-N-R_1 \\ | \quad | \\ O \quad R \end{array}$$

4. The compound of claim 3 wherein R is n—$C_4H_9$—.

5. The compound of claim 3 wherein R is $$\begin{array}{c} CH_2H_5 \\ | \\ CH_3(CH_2)_3-CH-CH_2- \end{array}$$

6. The compound of claim 3 wherein R is n—$C_{18}H_{37}$—.

7. The compounds of claim 1 wherein Y is phenylene substituted with 1 to 4 alkyl ($C_1$-$C_{18}$) groups.

8. The compounds of claim 1 wherein Y is biphenylene.

9. The compounds of claim 1 wherein Y is biphenylene substituted with 1 to 4 alkyl ($C_1$-$C_{18}$) groups.

10. The compounds of claim 8 represented by the formula:

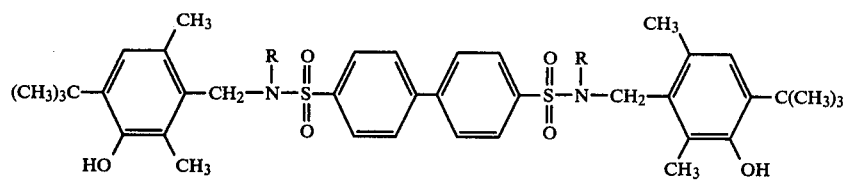

11. The compound of claim 10 wherein the R is n—$C_4$—$H_9$—.

12. The compound of claim 10 wherein the R is n—$C_{18}H_{37}$—.

13. A stabilized composition comprising a synthetic polymer normally subject to the deteriorative effects of heat and a stabilizing amount of a compound of the formula:

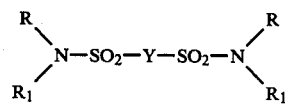

wherein Y is selected from phenylene, biphenylene, and phenylene or biphenylene substituted with one to four alkyl ($C_1$-$C_{18}$) groups, R represents alkyl of 1 to 18 carbon atoms and $R_1$ represents

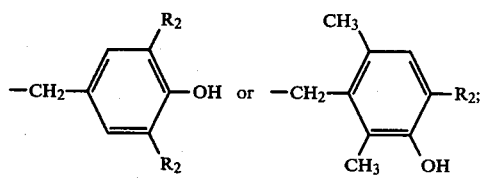

wherein $R_2$ represents a branched alkyl radical of 3 to 12 carbon atoms.

14. The composition of claim 13 wherein the synthetic polymer is a polyolefin.

15. The composition of claim 14 wherein the polyolefin is polypropylene.

16. The composition of claim 15 wherein the stabilizing amount is about 0.01 to 5% by weight based upon the polypropylene.

17. The composition of claim 15 further containing a stabilizing amount of a thiodipropionate ester and a divalent metal salt of a fatty acid of about 12 to 20 carbon atoms.

18. The composition of claim 17 wherein the thiodipropionate ester is present in about 0.1 to 2% by weight and the divalent metal salt is present in about 0.05 to 0.5% by weight, both based on the weight of the polymer.

19. The composition of claims 15 or 17 wherein the compound is of the formula:

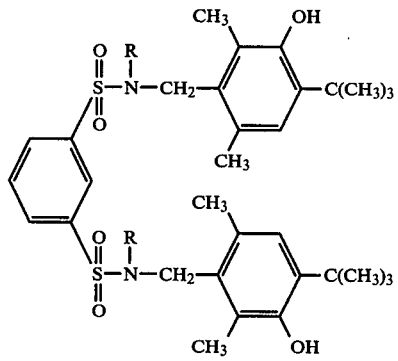

20. The composition of claims 15 or 17 wherein the compound is of the formula

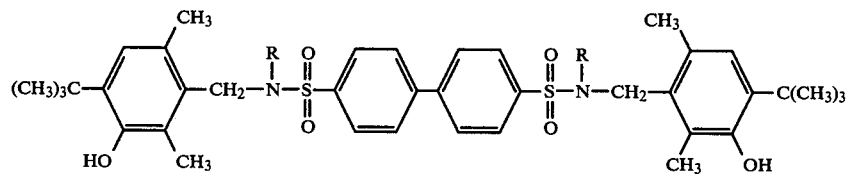

and R is n-butyl or n-octadecyl.

* * * * *